US011265100B2

(12) United States Patent
Beeri et al.

(10) Patent No.: US 11,265,100 B2
(45) Date of Patent: Mar. 1, 2022

(54) ERROR VECTOR MAGNITUDE REQUIREMENT NEGOTIATION FOR RANGING OPERATION

(71) Applicant: Apple Inc., Cupertino, CA (US)

(72) Inventors: Roy Beeri, Tel-Aviv (IL); Qi Wang, Sunnyvale, CA (US); Oren Shani, Saratoga, CA (US); Yoav Feinmesser, Tel Aviv (IL)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 16/662,582

(22) Filed: Oct. 24, 2019

(65) Prior Publication Data

US 2020/0136748 A1 Apr. 30, 2020

Related U.S. Application Data

(60) Provisional application No. 62/751,046, filed on Oct. 26, 2018.

(51) Int. Cl.
*H04W 4/00* (2018.01)
*H04L 1/00* (2006.01)
(Continued)

(52) U.S. Cl.
CPC .......... *H04L 1/0003* (2013.01); *H04B 17/21* (2015.01); *H04B 17/309* (2015.01); *H04L 1/20* (2013.01);
(Continued)

(58) Field of Classification Search
None
See application file for complete search history.

(56) References Cited

U.S. PATENT DOCUMENTS 10,631,187 B1 * 4/2020 Chu ............... H04W 24/10
2004/0218568 A1 * 11/2004 Goodall ........... H04W 48/20
370/332
(Continued)

OTHER PUBLICATIONS

"P802.11az/D0.4 Draft Standard for Information Technology—Telecommunications and Information Exchange Between Systems Local and Metropolitan Area Networks—Specfific Requirements Part 11: Wireless LAN Medium Access Control (MAC) and Physical Layer (PHY) Specifications—Amendment 8: Enhancements for Positioning," The Institute of Electrical and Electronics Engineers, Inc., 117 pages, Copyright 2018.
(Continued)

*Primary Examiner* — Clemence S Han
(74) *Attorney, Agent, or Firm* — Sterne, Kessler, Goldstein & Fox P.L.L.C.

(57) ABSTRACT

Some embodiments of this disclosure include apparatuses and methods for implementing a requirement negotiation for an error vector magnitude (EVM) (or other metrics for measuring transmission signal quality) for ranging and/or positioning operation(s). Some embodiments relate to an electronic device including a transceiver and one or more processors communicatively coupled to the transceiver. The one or more processors transmit, during a negotiation phase of a ranging operation, an initial request frame to a second electronic device, wherein the initial request frame comprises a first indication of an error vector magnitude (EVM) requirement. The one or more processors receive an initial response frame from the second electronic device and determine a second indication of the EVM requirement based at least in part on the received initial response frame. The one or more processors implement a measurement phase of the ranging operation in accordance with the second indication of the EVM requirement.

19 Claims, 9 Drawing Sheets

(51) Int. Cl.
  *H04L 1/20* (2006.01)
  *H04W 48/16* (2009.01)
  *H04B 17/309* (2015.01)
  *H04W 24/10* (2009.01)
  *H04B 17/21* (2015.01)
  *H04W 84/12* (2009.01)

(52) U.S. Cl.
  CPC ........... *H04W 24/10* (2013.01); *H04W 48/16* (2013.01); *H04W 84/12* (2013.01)

(56) References Cited

U.S. PATENT DOCUMENTS

| | | | |
|---|---|---|---|
| 2007/0009021 A1* | 1/2007 | Olgaard | H04B 17/21 375/224 |
| 2008/0125045 A1* | 5/2008 | Nakao | H04B 17/309 455/42 |
| 2013/0013763 A1* | 1/2013 | Chen | H04W 8/22 709/223 |
| 2016/0337985 A1* | 11/2016 | Amizur | H04W 24/10 |
| 2017/0127412 A1* | 5/2017 | Amizur | H04W 56/00 |
| 2017/0141875 A1* | 5/2017 | Eliaz | H04L 1/0003 |
| 2020/0068520 A1* | 2/2020 | Marri Sridhar | G01S 13/765 |
| 2020/0099418 A1* | 3/2020 | Rofougaran | H04W 72/046 |
| 2020/0112350 A1* | 4/2020 | Yang | H04B 7/088 |
| 2020/0252838 A1* | 8/2020 | Akdeniz | H04W 76/11 |

OTHER PUBLICATIONS

IEEE Std 802.11-2016 Part 11: Wireless LAN Medium Access Control (MAC) and Physical Layer (PHY) Specifications, IEEE Computer Society, 3534 pages, Dec. 7, 2016.

* cited by examiner

ERROR VECTOR MAGNITUDE REQUIREMENT NEGOTIATION FOR RANGING OPERATION

CROSS-REFERENCE TO RELATED APPLICATIONS

The present application claims the benefit of U.S. Provisional Patent Application No. 62/751,046, filed on Oct. 26, 2018, which is hereby incorporated by reference in its entirety.

BACKGROUND

Field

The described embodiments generally relate to ranging and positioning operations in wireless communications.

Related Art

An electronic device can use different methods for determining its location. For example, the electronic device may use satellite based systems (e.g., global positioning system (GPS)), cellular networks (e.g., 3G, 4G, 5G networks), wireless local area networks (WLANs) (also called Wi-Fi networks), or a combination thereof to determine its location. In some examples, the electronic device may use location determination using WLAN when the electronic device is inside a closed location (e.g., access to GPS is limited) or when the electronic device desires more accurate positioning determination. When determining the location, a trade off exits between the power consumed by the electronic device for position determination, the accuracy of the determined position, and the range of position determination.

SUMMARY

Some embodiments of this disclosure include apparatuses and methods for implementing improved ranging and/or positioning operation(s). The improved ranging and/or positioning operation(s) can include a negotiation phase for the requirement on error vector magnitude (EVM) (or other equivalent metrics for measuring transmission signal quality) of transmitted measurement frames.

Some embodiments relate to an electronic device. The electronic device includes a transceiver configured to communicate over a wireless network and one or more processors communicatively coupled to the transceiver. The one or more processors transmit, during a negotiation phase of a ranging operation, an initial request frame to a second electronic device, wherein the initial request frame comprises a first indication of an error vector magnitude (EVM) requirement for a first measurement frame (e.g., null data packet(s) (NDPs)) to be transmitted from the second electronic device to the electronic device. The one or more processors receive an initial response frame from the second electronic device and determine a second indication of the EVM requirement for the first measurement frame based at least in part on the received initial response frame. The one or more processors implement a measurement phase of the ranging operation in accordance with the second indication of the EVM requirement.

Some embodiments relate to a method including transmitting, from a first electronic device and during a negotiation phase of a ranging operation, an initial request frame to a second electronic device, where the initial request frame comprises a first indication of an error vector magnitude (EVM) requirement for a first measurement frame to be transmitted from the second electronic device to the first electronic device. The method further includes receiving, from the second electronic device, an initial response frame and determining a second indication of the EVM requirement for the first measurement frame based at least in part on the received initial response frame. The method also includes implementing a measurement phase of the ranging operation in accordance with at least one of the first indication of the EVM requirement or the second indication of the EVM requirement.

Some embodiments relate to a non-transitory computer-readable medium storing instructions. When the instructions are executed by a processor of an electronic device, the instructions cause the processor to perform operations including determining a first indication of an error vector magnitude (EVM) requirement for a first measurement frame to be transmitted from the second electronic device to the electronic device for a ranging operation. The operations further include transmitting, during a negotiation phase of the ranging operation, an initial request frame to a second electronic device, where the initial request frame comprises the first indication of the EVM requirement. The operations also include receiving, from the second electronic device, an initial response frame, where the initial response frame comprises a second indication of the EVM requirement for the first measurement frame. The operations further include transmitting, to the second electronic device, a first measurement frame in accordance with the first indication of the EVM requirement and receiving, from the second electronic device, a second measurement frame. The second measurement frame is generated in accordance with the second indication of the EVM requirement.

Some embodiments relate to an electronic device. The electronic device includes a transceiver configured to communicate over a wireless network and one or more processors communicatively coupled to the transceiver. The one or more processors receive a first measurement frame transmitted by a first electronic device in accordance with a first indication of an error vector magnitude (EVM) requirement associated with the first electronic device and determine a time of arrival of the first measurement frame at the electronic device. The one or more processors receive a second measurement frame transmitted by a second electronic device in accordance with a second indication of the EVM requirement associated with the second electronic device and determine a time of arrival of the second measurement frame at the electronic device. The one or more processor receive timing information transmitted by the first and second electronic devices. The one or more processors determine a relative distance from the first and second electronic devices based at least in part on the received timing information, the determined time of arrival of the first measurement frame, and the determined time of arrival of the second measurement frame.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims. Without loss of generality, the methods described in this document not only apply to the negotiation of EVM but also apply to the negotiation of other equivalent metrics that measure transmission signal quality.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
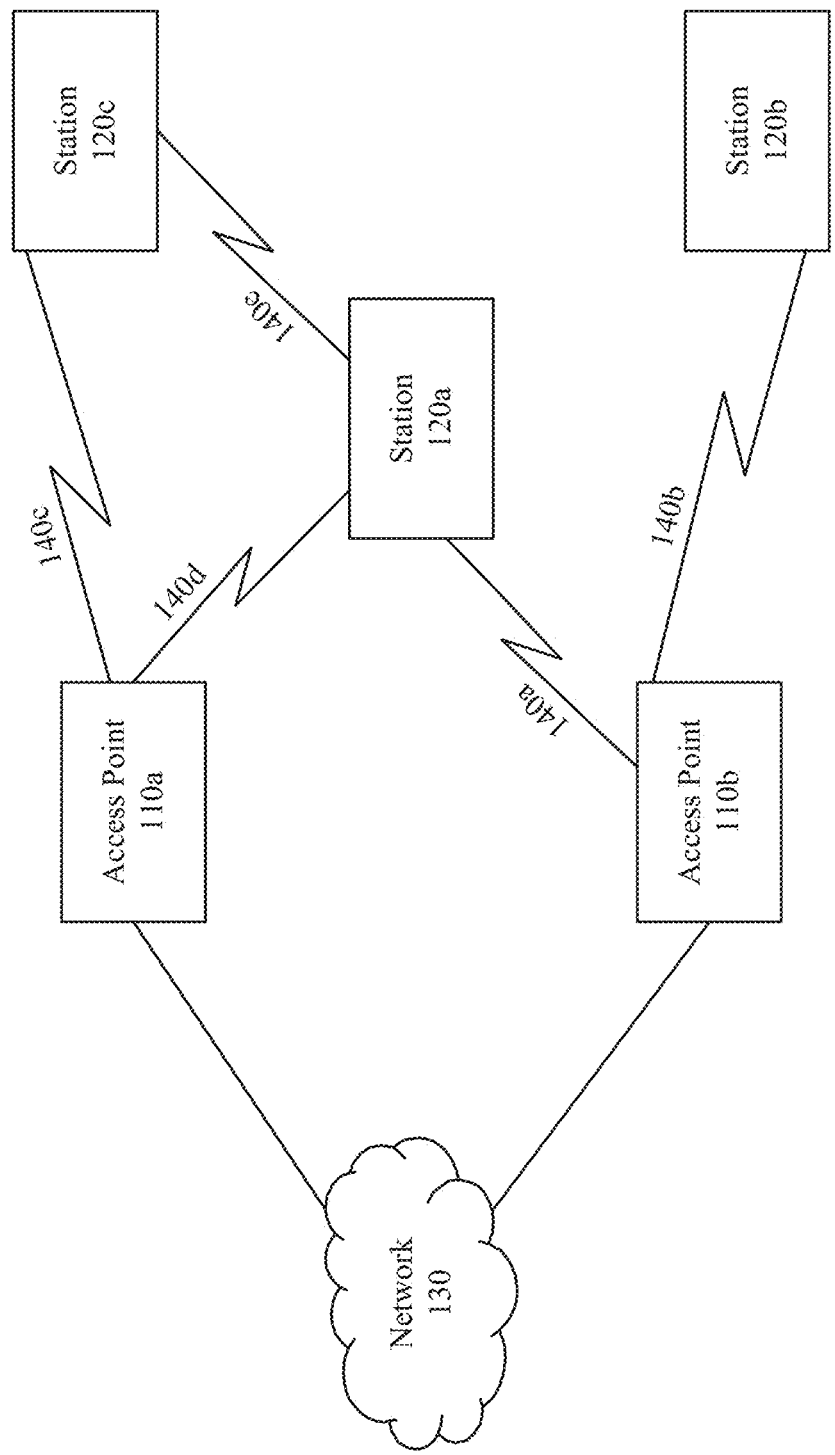
FIG. 1 illustrates an example system implementing an error vector magnitude (EVM) requirement negotiation for ranging and/or positioning operation(s), according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing improved ranging and/or positioning operation(s). The improved ranging and/or positioning operation(s) can include an error vector magnitude (EVM) requirement negotiation.

A ranging operation is an operation that enables, for example, a first electronic device to determine its distance from a second electronic device. The first electronic device can use three or more of the determined distances from three or more electronic devices to determine its position using a position operation. As discussed in more detail in the embodiments of this disclosure, to determine its distance from the second electronic device, the first electronic device communicates one or more packets or frames with the second electronic device. Using time(s) of departure and time(s) of arrival of the packets, the first electronic device is configured to determine its distance from the second electronic device.

The determination of the range (e.g., the distance from the second electronic device) is coupled with the transmission signal quality for transmitting the one or more frames between the first and the second electronic devices. One metric for the transmission signal quality can include the error vector magnitude (EVM). In one example, if the first electronic device desires to transmit a signal with a high Modulation and Coding Scheme (MCS) index value (as a non-limiting example, MCS7), the first electronic device may use an EVM associated with high quality transmission signal (as a non-limiting example, at least −27 dB). If the first electronic device desires to transmit a signal with a low MCS index value (as a non-limiting example, MCS0), the first electronic device may use an EVM associated with a lower quality transmission signal (as a non-limiting example, −9 dB). According to some embodiments, if the one or more packets are transmitted with higher transmission signal quality (e.g., higher EVM—higher absolute value of the EVM level), the transmission range of the one or more packets are less than the transmission range of the one or more packets if the one or more packets are transmitted with lower transmission signal quality (e.g., lower EVM—lower absolute value of the EVM level). However, when the one or more packets are transmitted with higher transmission signal quality, the distance(s) can be determined with more accuracy. Therefore, a tradeoff exists between the transmission signal quality and the transmission range. According to some embodiments, the ranging operation of the first electronic device can include a negotiation phase with the second electronic device to negotiate the EVM requirement to manage this tradeoff.

By negotiating EVM requirements and dynamically controlling the EVM levels, the embodiments of this disclosure are configured to manage between the required and/or desired accuracy for determining distances and the required and/or desired range for determining distances.

As a non-limiting example, when the first electronic device is within a stadium, the first electronic device can determine that it does not need to know its position (and therefore its distance from a second electronic device) with high accuracy. Also, the first electronic device can determine that the second electronic device may be located far from the first electronic device. Therefore, the first electronic device can use lower transmission signal quality (e.g., lower EVM) with higher transmission range for its ranging operation. In contrast, in another non-limiting example, when the first electronic device is in a shopping mall, the first electronic device can determine that it needs to know its position (and therefore its distance from a second electronic device) with high accuracy. The high accuracy of the ranging operation (and/or positioning operation) can help the first electronic device determine the store(s) within the shopping mall to which it is close. Also, the first electronic device can determine that the second electronic device may be located close to the first electronic device. Therefore, the first electronic device can use higher transmission signal quality (e.g., higher EVM) with lower transmission range for its ranging operation.

According to some examples, the EVM is a measure of the quality of a signal transmitted and/or received within a wireless communication system. In an ideal system, the constellation points of a received signal are at their ideal locations, e.g., at the locations where they were generated at the transmitter. However, because of limitations and/or errors in the system, an error can exist between the constellation points of the received signal and their ideal locations. An error vector can be a vector (for example, in an I-Q plane) between the received constellation points and the ideal locations. The error vector, in other words, is the difference between an actual received symbol and an ideal symbol. In some examples, the difference between an actual received symbol and an ideal symbol is determined after the received signal is equalized (e.g., passed through an equalizer). According to some examples, an average amplitude of the error vector, normalized to peak signal amplitude, can be the EVM. It is noted that other calculations can be used for determining the EVM as the difference between an actual received symbol and an ideal symbol.

FIG. 1 illustrates an example system 100 implementing an error vector magnitude (EVM) requirement negotiation for ranging and/or positioning operation(s), according to some embodiments of the disclosure. Example system 100 is provided for the purpose of illustration only and is not limiting of the disclosed embodiments. System 100 may include, but is not limited to, stations 120, access points 110, and network 130. Stations (STAs) 120a-120c may include, but are not limited to, Wireless Local Area Network (WLAN) stations such as wireless communication devices, smart phones, laptops, desktops, tablets, personal assistants, monitors, televisions, and the like. Access point (AP) 110 may include but are not limited to WLAN electronic devices such as a wireless router, a wearable device (e.g., a smart watch), a wireless communication device (e.g., a smart phone), or a combination thereof. Network 130 may be the Internet and/or a WLAN. Station 120's communications are shown as wireless communications 140. The wireless communications 140a-140e can be based on a wide variety of wireless communication techniques. These techniques can include, but are not limited to, techniques based on IEEE 802.11, IEEE 802.11v, IEEE 802.11ax, IEEE 802.11az, etc. standards.

It is noted that although some embodiments are discussed with respect to some examples of WLAN, the embodiments of this disclosure are not limited to these examples of WLAN and can be used for ranging and/or location operation(s) using other WLAN topologies such as, but not limited to, infrastructure network, peer-to-peer network, mesh network, and the like.

Also, the embodiments of this disclosure are not limited to WLAN and can be used for other communication systems. For example, the embodiments of this disclosure can be implemented for ranging and/or location operation(s) using cellular technologies in cellular networks such as, but not limited to, 3G/4G/5G networks such as Universal Mobile Telecommunications System (UMTS), Long-Term Evolution (LTE), and the like. The embodiments of this disclosure can also be implemented for ranging and/or location operation(s) using Bluetooth™ technologies such as, but not limited to, Bluetooth™ protocol, the Bluetooth™ Low Energy protocol, or the Bluetooth™ Low Energy Long Range protocol.

In addition to ranging and/or location operation(s), the embodiments of this disclosure can also be applied to other protocols and operations, e.g., in WLAN, cellular, and/or Bluetooth™. For example, the embodiments of this disclosure can be applied to beam forming procedures for data communication.

According to some embodiments, AP 110 and STAs 120 are configured to implement EVM requirement negotiation for ranging and/or positioning operation(s). During the ranging operation, STA 120a is configured to communicate with AP 110a to determine STA 120a's distance from AP 110a, according to some examples. It is noted that although some embodiments of this disclosure are discussed with respect to a ranging operation, the embodiments of this disclosure also apply to location operation(s). Also, although some embodiments of this disclosure are discussed with respect to the ranging operation between STA 120a and AP 110a, the embodiments of this disclosure also apply to ranging operations between any two or more electronic devices. For example, the embodiments of this disclosure also apply to ranging operations between STAs 120, between APs 110, between any STA 120 and any AP 120, and the like.

The ranging operation can include a ranging session such as, but not limited to, a fine timing measurement (FTM) ranging session. The ranging operation can include a negotiation phase, a measurement phase, and a termination phase, according to some embodiments. During the negotiation phase, STA 120a transmits an initial request frame to AP 110a. According to some examples, the initial request frame can include an initial FTM request frame. The initial request frame can include a set of measurement parameters that can describe STA 120a's availability and capability for the ranging operation. The set of measurement parameters can include, but is not limited to, a bandwidth to be used for the measurement phase, a number of repetitions to be used for the measurement phase, and the like. According to some examples, the initial request frame can include STA 120a's EVM requirement. The EVM requirement can include STA 120a's required and/or desired EVM level for AP 110a to meet when AP 110 transmits measurement frame(s) (e.g., null data packet(s) (NDP)) to STA 120a. According to some embodiments, when STA 120a transmits its EVM requirement (e.g., its required and/or desired EVM level), STA 120a also indicates that STA 120a uses such EVM level in its own transmission to AP 110a. Additionally or alternatively, when STA 120a transmits its EVM requirement, STA 120a also indicates its EVM level that it will use for its transmission to AP 110a. In this example, the indicated STA 120a's EVM level can be the same as or different than the EVM level requested for AP 110a.

After receiving the initial request frame, AP 110a can transmit an initial response frame to STA 120a. In an example, AP 110a transmits the initial response frame within a predetermined time (e.g., 10 ms.) The initial response frame can include an initial FTM frame. The initial response frame can include a set of measurement parameters that describe AP 110's availability and capability for the ranging operation. The set of measurement parameters can include, but is not limited to, the bandwidth to be used for the measurement phase, the number of repetitions to be used for the measurement phase, and the like. According to some embodiments, the initial response frame from AP 110a to STA 120a can include information indicating whether AP 110a can meet the requested EVM requirement. For example, the initial response frame can include AP 110's actual EVM level, which can be a level closest to the requested EVM level (requested by STA 120a) and is supported by the AP 110a's capability. Additionally or alternatively, the initial response frame can include a status indication field value to indicate whether AP 110a can meet the requested EVM requirement. For example, AP 110a can set the status indication field value of the initial response frame to a first value (e.g., "2") to indicate that AP 110a cannot meet the requested EVM requirement. AP 110a can set the status indication field value of the initial response frame to a second value (e.g., "1") to indicate that AP 110a can meet the requested EVM requirement.

After receiving the initial response frame from AP 110a, STA 120a can decide whether to continue or terminate the ranging operation, according to some embodiments. The exchange of the initial request frame and the initial response frame can ensure an agreement between STA 120a and AP 110a on the parameters (including, but not limited to, the EVM requirement) for the ranging operation. According to some embodiments, if no agreement is reached between STA 120a and AP 110a, STA 120a can terminate the ranging operation. Alternatively, if no agreement is reached, STA 120a can continue with the ranging operation with available/possible parameters. If an agreement is reached between STA 120a and AP 110a, STA 120a can continue with the ranging operation with the agreed-on parameters.

By negotiating EVM requirements and dynamically controlling the EVM levels, STA 120a and/or AP 110 are configured to manage between the required and/or desired accuracy for determining distances and the required and/or desired range for determining distances.

If STA 120a continues with the ranging operation, the next phase after the negotiation phase is the measurement phase. During the measurement phase, STA 120a transmits a first measurement frame to AP 110a. STA 120a transmits the first measurement frame using the agreed-on parameters (e.g., the negotiated EVM requirement). After receiving the first measurement frame, AP 110a transmits a second measurement frame to STA 120a. According to some embodiments, AP 110a transmits the second measurement frame using the agreed-on parameters (e.g., the negotiated EVM requirement). STA 120a can transmit the time of departure (ToD) of the first measurement frame and the time of arrival (ToA) of the second measurement frame to AP 110a. Similarly, AP 110a can transmit the time of arrival (ToA) of the first measurement frame and the time of departure (ToD) of the second measurement frame to STA 120a. Using the ToD and ToA of the first measurement frame and the ToD and ToA of the second measurement frame, STA 120a can determine its distance from AP 110a, according to some embodiments. Similarly, using the ToD and ToA of the first measurement frame and the ToD and ToA of the second measurement frame, AP 110a can determine its distance from STA 120a, according to some embodiments. In addition to ToD and ToA, STA 120a and AP 110a can use directional measurement (e.g., measurement of angle of arrival (AoA) and/or angle of departure (AoD)) to assist with the ranging and/or positioning operation(s), according to some embodiments. In some embodiments, an alternative order of the measurement frame transmissions is used, where AP 110 transmits the first measurement frame before STA 120a transmits the second measurement frame, each applying the negotiated respective EVM level for its transmission.

In some examples, STA 120a can use similar ranging operation with two or more other access points (e.g., AP 110b and another AP—in addition to AP 110a). Using the determined distances and known positions of the APs, STA 120a can determine its position. STA 120a can use triangulation to determine its position, according to some embodiments.

After the measurement phase is complete, STA 120a can terminate the ranging operation (e.g., termination phase).

Figure 2:
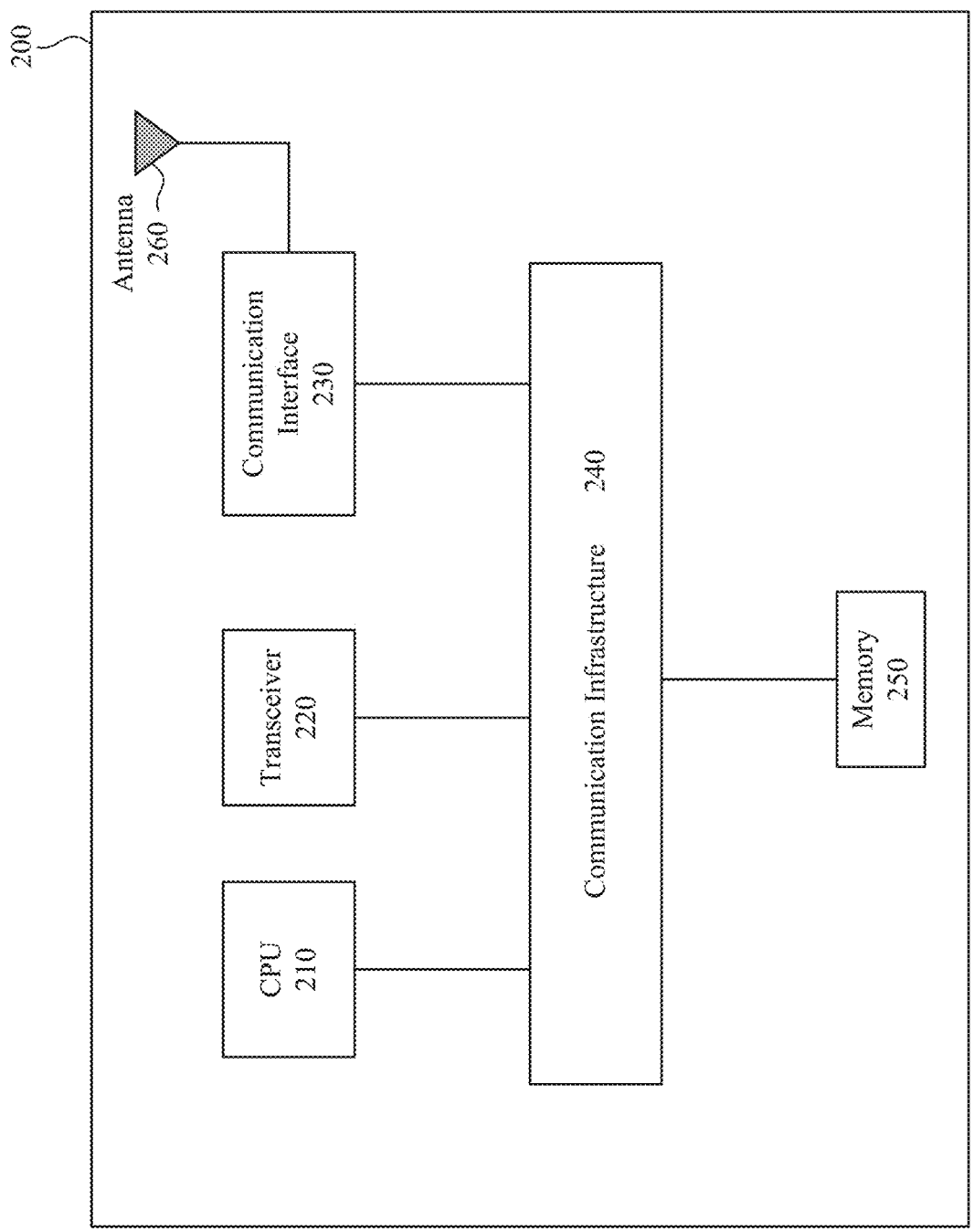
FIG. 2 illustrates a block diagram of an example wireless system of an electronic device implementing an error vector magnitude (EVM) requirement negotiation for ranging and/or positioning operation(s), according to some embodiments of the disclosure.

FIG. 2 illustrates a block diagram of an example wireless system 200 of an electronic device implementing an error vector magnitude (EVM) requirement negotiation for ranging and/or positioning operation(s), according to some embodiments of the disclosure. System 200 may be any of the electronic devices (e.g., AP 110, STA 120) of system 100. System 200 includes central processing unit (CPU) 210, transceiver 220, communication interface 230, communication infrastructure 240, memory 250, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, an operating system (not shown) can be stored in memory 250 and can manage transfer of data from memory 250 and/or one or more applications (not shown) to CPU 210, transceiver 220, and/or communication interface 230. In some examples, the operating system maintains one or more network protocol stacks (e.g., Internet protocol stack, cellular protocol stack, and the like) that can include a number of logical layers. At corresponding layers of the protocol stack, the operating system includes control mechanism and data structures to perform the functions associated with that layer.

In addition to or in alternate to the operating system, system 200 can include communication infrastructure 240. Communication infrastructure 240 provides communication between, for example, CPU 210, transceiver 220, communication interface 230, and memory 250. Communication infrastructure 240 may be a bus. CPU 210 together with instructions stored in memory 250 perform operations enabling wireless system 200 to implement the EVM requirement negotiation and the ranging and/or positioning operation(s) as described herein.

Transceiver 220 transmits and receives communications signals that support the EVM requirement negotiation and the ranging and/or positioning operation(s), according to some embodiments, and may be coupled to antenna 260. Antenna 260 may include one or more antennas that may be the same or different types. Communication interface 230 allows system 200 to communicate with other devices that may be wired and/or wireless. Transceiver 220 and/or communication interface 230 can include processors, controllers, radios, sockets, plugs, and like circuits/devices used for connecting to and communication on networks. According to some examples, transceiver 220 and/or communication interface 230 includes one or more circuits to connect to and communicate on wired and/or wireless networks. Transceiver 220 and/or communication interface 230 can include a cellular subsystem, a WLAN subsystem, and a Bluetooth™ subsystem, each including its own radio transceiver and protocol(s) as will be understood by those skilled arts based on the discussion provided herein. Transceiver 220 and/or communication interface 230 can include more or less systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to networks based on standards described in IEEE 802.11.

According to some embodiments, CPU 210, alone or in combination with memory 250, transceiver 220, and/or communication interface 230, implements the EVM requirement negotiation and the ranging and/or positioning operation(s). For example, CPU 210, alone or in combination with memory 250, transceiver 220, and/or communication interface 230 implements the negotiation phase including the EVM negotiation, the measurement phase of the ranging and/or positioning operations, and/or the termination phase of the ranging and/or positioning operations, as discussed herein.

Figure 3:
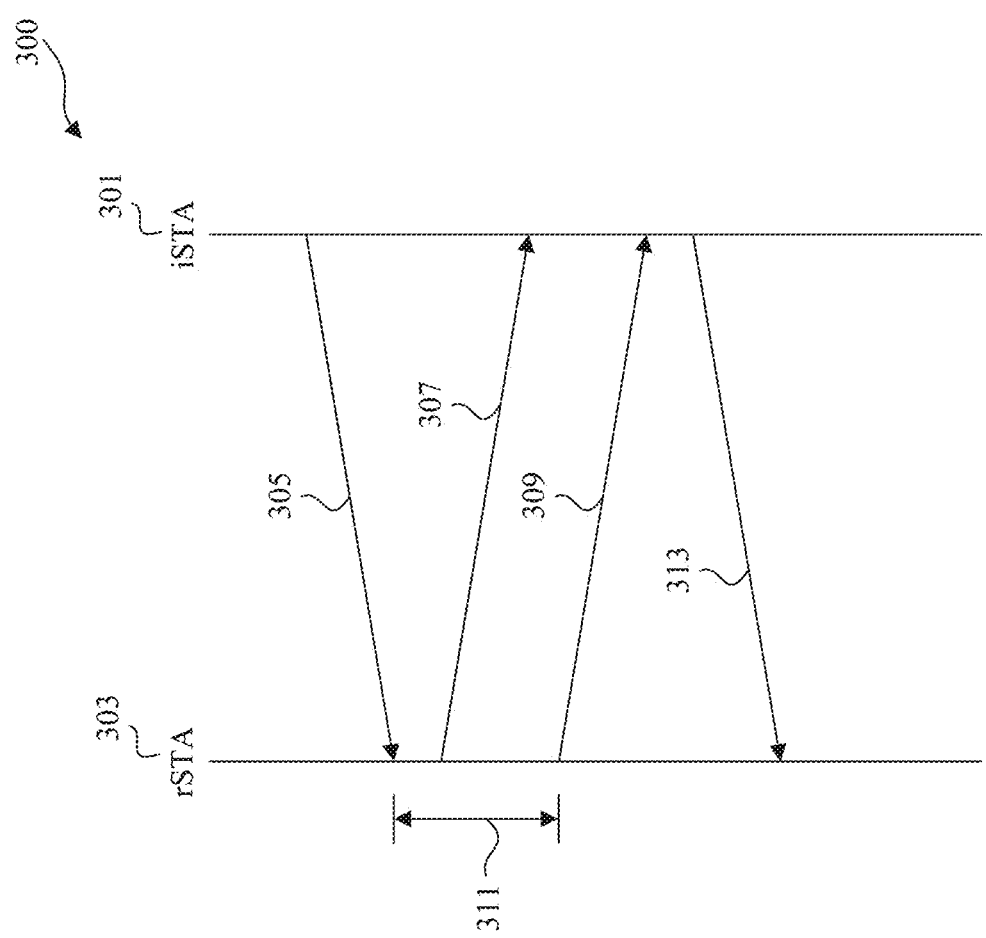
FIG. 3 illustrates example operations of communication between two electronic devices for an error vector magnitude (EVM) requirement negotiation, according to some embodiments of the disclosure.

FIG. 3 illustrates example operations of communication between two electronic devices for an error vector magnitude (EVM) requirement negotiation, according to some embodiments of the disclosure. FIG. 3 may be described with regard to elements of FIG. 1. Operation 300 of FIG. 3 represents the communication between two electronic devices—initiating station (iSTA) 301 and responding station (rSTA) 303. According to some examples, iSTA 301 or rSTA 303 can be any one of STAs 120 and/or APs 110. Operation 300 of FIG. 3 can include the EVM requirement negotiation.

According to some embodiments, iSTA 301 transmits an initial request frame 305 to rSTA 303. In general, the data communicated between iSTA 301 and rSTA 303 in the disclosed embodiments may be conveyed in packets or frames that are transmitted and received by radios in iSTA 301 and rSTA 303 in accordance with a communication protocol, such as an Institute of Electrical and Electronics Engineers (IEEE) 802.11 standard, Bluetooth™ (from the Bluetooth Special Interest Group of Kirkland, Wash.), a cellular-telephone communication protocol, and/or another type of wireless interface (such as a peer-to-peer communication technique, a mesh-network technique, and the like). Some of the embodiments are discussed with respect to a wireless local area Network (WLAN), but the embodiments of this disclosure are not limited to use with a WLAN.

According to some embodiments, iSTA 301 transmits initial request frame 305 when iSTA 301 initiates the EVM requirement negotiation. Additionally or alternatively, iSTA 301 transmits initial request frame 305 when iSTA 301 updates one or more measurement parameters such as, but not limited to, the EVM requirement. According to some examples, initial request frame 305 can be an initial FTM request frame. Initial request frame 305 can include a set of measurement parameters that can describe iSTA 301's availability and capability for the ranging operation. According to some examples, initial request frame 305 can include iSTA 301's EVM requirement. Additionally or alternatively, initial request frame 305 can include updated measurement parameter(s) such as, but not limited to, updated EVM requirement, transmitted during the measurement phase operation.

The EVM requirement can include iSTA 301's required and/or desired EVM level for rSTA 303 to meet when rSTA 303 transmits measurement frame(s) (e.g., null data packet(s) (NDP)) to iSTA 301. According to some embodiments, when iSTA 301 transmits its EVM requirement (e.g., its required and/or desired EVM level), iSTA 301 also indicates that iSTA 301 uses such EVM level in its own transmission to rSTA 303. Additionally or alternatively, when iSTA 301 transmits its EVM requirement, iSTA 301 also indicates iSTA 301's EVM level that iSTA 301 will use for its transmission to rSTA 303. In this example, the indicated iSTA 301's EVM level can be the same as or different than the EVM level requested for rSTA 303.

When determining the EVM requirement, iSTA 301 can consider the tradeoff between a high EVM level and a low EVM level. A high EVM level improves ranging accuracy but usually requires iSTA 301 and/or rSTA 303 to reduce its transmitter output power, and therefore limits the distance at which the ranging operation can be performed. On the other hand, a low EVM level may degrade accuracy but enable the ranging operation be performed at a further distance.

According to some embodiments, rSTA 303 can send an acknowledgment (ACK) 307 after receiving initial request frame 305. In some embodiments, ACK 307 can be optional.

After receiving initial request frame 305, or after transmitting the optional ACK 307, rSTA 303 can transmit an initial response frame 309 to iSTA 301. In an example, rSTA 303 transmits initial response frame 309 within a predetermined time 311 (e.g., 10 ms). Initial response frame 309 can include an initial FTM frame. As discussed above, initial response frame 309 can include a set of measurement parameters that describe rSTA 303's availability and capability for the ranging operation. According to some embodiments, initial response frame 309 can include information indicating whether rSTA 303 can meet the requested EVM requirement. For example, initial response frame 309 can include rSTA 303's actual EVM level, which can be a level closest to the requested EVM level (requested by iSTA 301) and is supported by the rSTA 303's capability. In some examples, when rSTA 303 transmits its actual EVM level, such EVM level is included in initial response frame 309 (e.g., within a container in initial response frame 309).

Additionally or alternatively, initial response frame 309 can include a status indication field value to indicate whether rSTA 303 can meet the requested EVM requirement. As a non-limiting example, the status indication field of initial response frame 309 can have four values—e.g., "0", "1", "2", and "3". In this non-limiting example, value "0" can be a reserved value. rSTA 303 can set the status indication field value of initial response frame 309 to, for example, "1" to indicate that rSTA 303 can meet the requested EVM requirement. rSTA 303 can set the status indication field value of initial response frame 309 to, for example, "2" to indicate that rSTA 303 cannot meet the requested EVM requirement. In some examples, value "2" of the status indication field can also signal to iSTA 301 not to send the same request (e.g., with the same set of measurement parameters) and that the ranging operation is terminated. rSTA 303 can set the status indication field value of initial response frame 309 to, for example, "3" to indicate that the request from iSTA 301 has failed. In some examples, value "3" of the status indication field can also signal to iSTA 301 not to send any new request for a determined period of time, and that the ranging operation is terminated.

After receiving initial response frame 309 from rSTA 303, iSTA 301 transmits an acknowledgment (ACK) 313. According to some embodiments, ACK 313 is optional.

TSTA 301 can also decide whether to continue or terminate the ranging operation, according to some embodiments.

According to some embodiments, the requested EVM requirement (requested by, for example, iSTA 301) can be located within a container in initial request frame 305. The reported EVM requirement (reported by, for example rSTA 303) can be located within a container in initial response frame 309. According to some embodiments, the container in initial request frame 305 and/or the container in initial response frame 309 can include a field or a subfield of a frame, an Information Element, an Information subelement, or the like. In some examples, the format of the container in initial request frame 305 can be the same as or similar to the format of the container in initial response frame 309. As a non-limiting example, the container for the iSTA 301's EVM requirement (in initial request frame 305) can include 6 bits in duration, where the value can be expressed in units of dB. For example, the allowed values can be [0:63], which corresponds to [0 dB EVM: −63 dB EVM]. In a non-limiting example, the granularity of the steps between the lowest and highest EVM may be 3 dB or less. However, the embodiments of this disclosure are not limited to these examples and other formats, containers, units, and/or field duration may be used for communicating the requested and/or responded EVM requirements. The EVM re-negotiation can occur during the measurement phase operation. In some embodiments, other types of frames, instead of the initial request frame and/or the initial response frame, can be used to contain the EVM requirement.

Figure 4B:
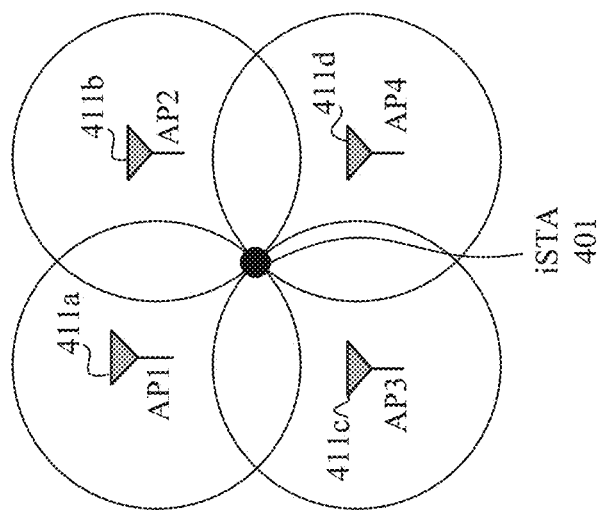
FIG. 4B illustrates an example positioning determination using triangulation, according to some embodiments of the disclosure.
Figure 4A:
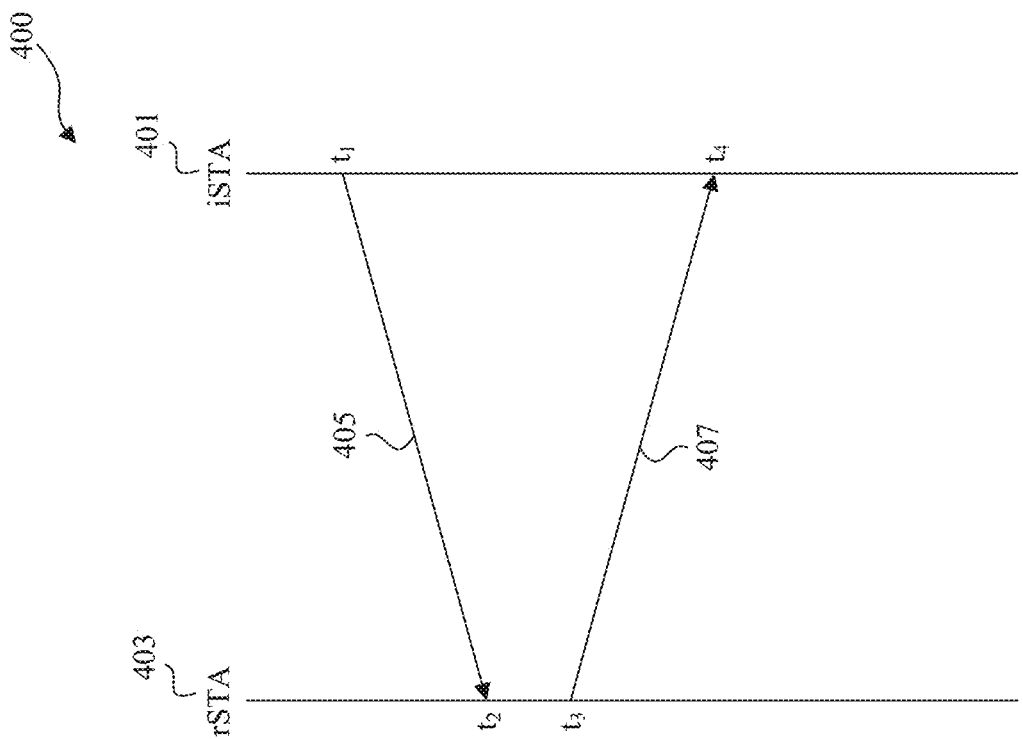
FIG. 4A illustrates example operations of communication between two electronic devices for measurement phase of a ranging operation, according to some embodiments of the disclosure.

FIG. 4A illustrates example operations of communication between two electronic devices for a measurement phase of a ranging operation, according to some embodiments of the disclosure. FIG. 4A may be described with regard to elements of FIG. 1. Operation 400 of FIG. 4A represents the communication between two electronic devices—initiating station (iSTA) 401 and responding station (rSTA) 403. According to some examples, iSTA 401 or rSTA 403 can be any one of STAs 120 and/or APs 110. Operation 400 of FIG. 4A can include the measurement phase of the ranging operation. The measurement phase may include a time of flight (ToF) measurement, according to some embodiments.

After the iSTA 401 and rSTA 403 have negotiated the set of measurement parameters including, but not limited to, the EVM requirement using, for example, the EVM requirement negotiation phase of operation 300 of FIG. 3, iSTA 401 and rSTA 403 can perform the measurement phase of the ranging operation. The exchange of initial request frame 305 and initial response frame 309 of FIG. 3 can ensure an agreement between iSTA 401 and rSTA 403 on the parameters (including, but not limited to, EVM requirement) for the ranging operation. If an agreement is reached between iSTA 401 and rSTA 403, iSTA 401 can perform the ranging operation using the agreed-on parameters.

During the measurement phase operation 400, iSTA 401 transmits a first measurement frame 405 to rSTA 403. iSTA 401 transmits first measurement frame 405 using the agreed-on parameters (e.g., the negotiated EVM requirement). The measurement phase operation 400 can be based on a number of ranging modes defined for fine timing measurement (FTM) protocol. In one example, first measurement frame 405 can include null data packets (NDPs) used in accordance with a trigger-based (e.g., formerly known as HEz-based) ranging measurement mode. In another example, first measurement frame 405 can include NDPs used in accordance with a non-trigger-based (e.g., formerly known as VHTz-based) ranging measurement mode. NDP is a frame that has only the physical layer (PHY) header, but does not contain the media access control (MAC) data payload. According to some embodiments NPDs are used for estimation of a channel between two stations. iSTA 401 transmits first measurement frame 405 based on the EVM level negotiated and agreed-on during, for example, operation 300.

According to some examples, iSTA 401 transmits first measurement frame at ToD time instant $t_1$. rSTA 403 receives first measurement frame 405 at ToA time instant $t_2$. After receiving first measurement frame 405, rSTA 403 transmits a second measurement frame 407 to iSTA 401 at ToD time instant $t_3$. According to some embodiments, rSTA 403 transmits second measurement frame 407 using the agreed-on parameters (e.g., the negotiated EVM requirement). In other words, rSTA 403 transmits second measurement frame 407 based on the EVM level negotiated and agreed-on during, for example, operation 300. iSTA 401 receives second measurement frame 407 at ToA time instant $t_4$.

Although not shown, iSTA 401 can transmit the value of ToD time instant $t_1$ and the value of ToA time instant $t_4$ to rSTA 403. In some embodiments, iSTA 401 can transmit the value of ToD time instant $t_1$ along with first measurement frame 405. Similarly, rSTA 403 can transmit the value of ToD time instant $t_3$ and the value of ToA time instant $t_2$ to iSTA 403. In some examples, rSTA 403 can transmit the value of ToD time instant $t_3$ and the value of ToA time instant $t_2$ along with the second measurement frame 407. Using these time instants, iSTA 401 can determine its distance from rSTA 403, according to some embodiments. For example, iSTA 401 can use the following equation to determine the distance from rSTA 403:

$$\text{distance} = [(t_4 - t_1) - (t_3 - t_3)] \times \frac{c}{2},$$

where c is the speed of light.

Similarly, rSTA 403 can use the same equation to determine the distance from iSTA 401. According to some embodiments, iSTA 401 and/or rSTA 403 may transmit the values of the time instants in a unicast mode. Additionally or alternatively, iSTA 401 and/or rSTA 403 may transmit the values of the time instants in a broadcast mode.

In addition to the above ToD and ToA, iSTA 401 and rSTA 403 can use directional measurement (e.g., measurement of angle of arrival (AoA) and/or angle of departure (AoD)) to assist with the ranging and/or positioning operation(s), according to some embodiments.

In some embodiments (or some ranging modes), during the measurement phase after the negotiation phase, rSTA 403 may transmit the first measurement frame to iSTA 401, followed by a second measurement frame transmitted from iSTA 401 to rSTA 403. The principle and method of using the four timestamps to compute the distance between the two devices remains the same. According to some embodiments, the device that computes the distance is the one that initiates the EVM negotiation, regardless of the direction of the first and the second measurement frames.

FIG. 4B illustrates an example positioning determination using triangulation, according to some embodiments of the disclosure. FIG. 4B may be described with regard to elements of FIGS. 1 and 4A. FIG. 4B represents the communication between five electronic devices—initiating station (iSTA) 401 and access points 411. According to some examples, iSTA 401 or AP 411 can be any one of STAs 120 and/or APs 110.

In some examples, iSTA 401 can use similar ranging operation discussed with respect to FIGS. 3 and 4A with AP1 411a, AP2 411b, and AP3 411c. Accordingly, iSTA 401 can determine its respective distance from each of AP1 411a, AP2 411b, and AP3 411c. Using the determined respective distances and also known positions of AP1 411a, AP2 411b, and AP3 411c, iSTA 411 can determine its position. iSTA 411 can use triangulation to determine its position, according to some embodiments.

Figure 5A:
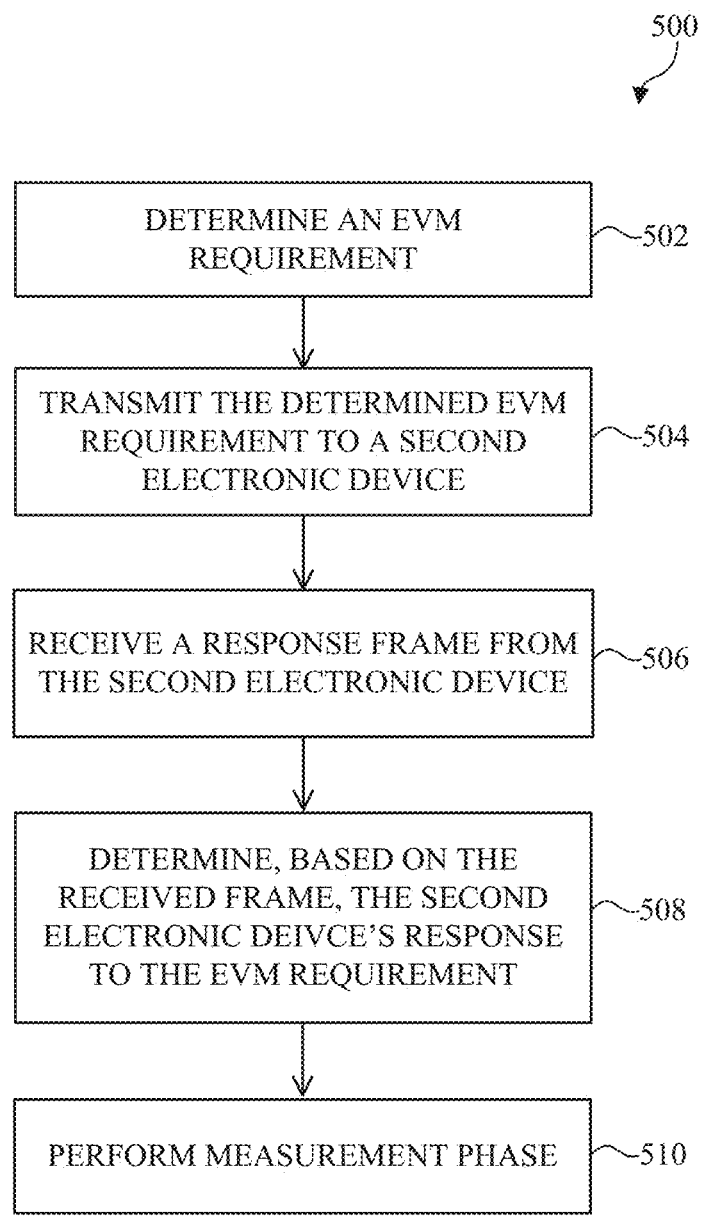
FIG. 5A illustrates an example method for a wireless system implementing an error vector magnitude (EVM) requirement negotiation, according to some embodiments of the disclosure.

FIG. 5A illustrates an example method 500 for a wireless system implementing an error vector magnitude (EVM) requirement negotiation, according to some embodiments of the disclosure. As a convenience and not a limitation, FIG. 5A may be described with regard to elements of FIGS. 1-4. Method 500 may represent the operation of an electronic device, e.g., iSTA 301 of FIG. 3 implementing the EVM requirement negotiation. Method 500 may also be performed by system 200 of FIG. 2 and/or computer system 800 of FIG. 8. But method 500 is not limited to the specific embodiments depicted in those figures and other systems may be used to perform the method as will be understood by those skilled in the arts. It is to be appreciated that not all operations may be needed, and the operations may not be performed in the same order as shown in FIG. 5A.

At 502, the electronic device (e.g., iSTA 301 of FIG. 3) determines an EVM requirement. According to some embodiments, iSTA 301 takes into account different information in determining the EVM requirement. In one example, iSTA 301 can consider the use case for the ranging operation in determining the EVM requirement. Different use cases may have different requirements for ranging accuracy. For example, iSTA 301 can consider the requirements of a client application on, for example, iSTA 301 that will use the ranging operation (and the determined distance) in determining the EVM requirement. If a higher accuracy is desired, then a higher quality transmission signal (e.g., higher EVM) for transmitting the measurement frame(s) is used. But, if a lower accuracy is acceptable, then a lower quality transmission signal (e.g., lower EVM) for transmitting the measurement frame(s) is used.

As another example, iSTA 301 can use the signal to noise ratio (SNR) on the channel (channel between, for example, iSTA 301 and rSTA 303) and/or the SNR at iSTA 301 in determining the EVM requirement. Additionally or alternatively, iSTA 301 can consider an internal algorithm used by the iSTA 301 for estimating the ToA of the measurement frame (e.g., NDP), or the directional (e.g., the angular) measurement of NDP in determining the EVM requirement. For example, if iSTA 301 does not support an algorithm that uses a high EVM level, iSTA 301 will not request that rSTA 303 use a high EVM level. These factors in determining the EVM requirement are provided as examples. Alternatively or additionally, iSTA 301 can use other factor(s) to determine the EVM requirement.

According to some embodiments, the EVM requirement can include two EVM levels. A first EVM level is signaled from iSTA 301 to rSTA 303 such that the transmission of measurement frame(s) from rSTA 303 to iSTA 301 would be in accordance with this first EVM level. The second EVM level can indicate the EVM requirement for transmission of measurement frame(s) from iSTA 301 to rSTA 303. iSTA 301 can also signal the second EVM level to rSTA 303. According to some embodiments, the first and second EVM levels can be the same or similar in value. Alternatively, the first and second EVM levels can have different values.

At 504, iSTA 301 transmits the EVM requirement to a second electronic device, e.g., rSTA 303. For example, iSTA 301 transmits initial request frame 305 to rSTA 303, where initial request frame 305 includes an indication of the EVM requirement. The indication of the EVM requirement can include the first EVM level and/or the second EVM level, according to some embodiments. For example, iSTA 301 transmits the first EVM level of the determined EVM requirement to rSTA 303. Additionally or alternatively, iSTA 301 transmits the second EVM level of the determined EVM requirement to rSTA 303.

At 506, iSTA 301 receives a response frame from the second electronic device, e.g., rSTA 303. For example, iSTA 301 receives an initial response frame 309 from the second electronic device. In some example, before receiving initial response frame 309, iSTA 301 can receive an acknowledgment (e.g., ACK 307) from rSTA 303 indicating the receipt of initial request frame 305.

At 508, iSTA 301 can determine the second electronic device's response to the EVM requirement. As discussed below, the second electronic device's response to the EVM requirement can include the second electronic device's indication of the EVM requirement. iSTA 301 can determine the second electronic device's response to the EVM requirement based at least in part on the received initial response frame 309. For example, initial response frame 309 can include information indicating whether the second electronic device can meet the requested EVM requirement. For example, initial response frame 309 can include a third EVM level. In some embodiments the third EMV level is the same as, or similar to, the requested EVM level (requested by iSTA 301, e.g., first EMV level). Alternatively, the third EMV level is the second electronic device's actual EVM level, which can be a level closest to the requested EVM level (requested by iSTA 301, e.g., first EMV level) and is supported by the rSTA 303's capability. The third EVM level may be different than the first EVM level. In some examples, when iSTA 301 determines the third EVM level (e.g., the second electronic device's actual EVM level) based at least in part on the initial response frame 309.

Additionally or alternatively, iSTA 301 can determine the second electronic device's response to the requested EVM requirement from a status indication field value within initial response frame 309. The status indication field value indicates whether rSTA 303 can meet the requested EVM requirement.

In some examples, at 508, iSTA 301 can also send an acknowledgment (e.g., ACK 313) to the second electronic device indicating the receipt of initial response frame 305.

At 510, iSTA 301 performs the measurement phase of the ranging operation based on the negotiated and agreed-on EVM requirement (e.g., the second EVM level and the third EVM level).

Figure 5B:
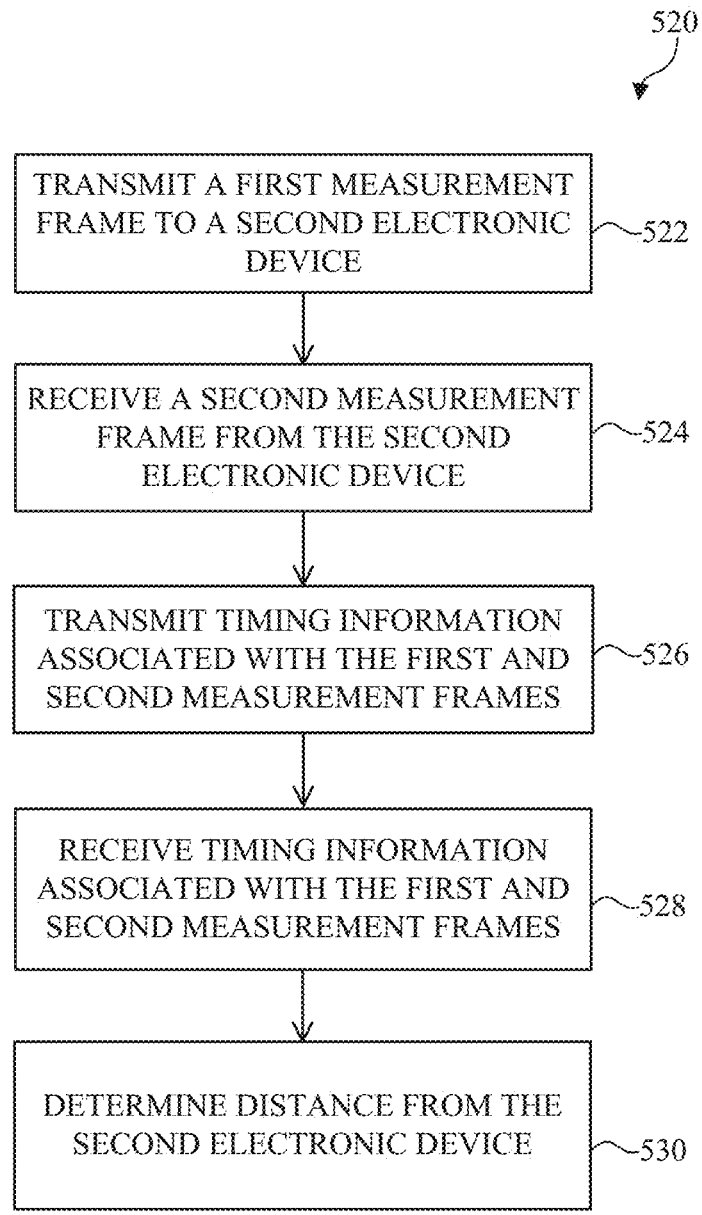
FIG. 5B illustrates an example method for a wireless system implementing a measurement phase of the ranging operation, according to some embodiments of the disclosure.

FIG. 5B illustrates an example method 520 for a wireless system implementing a measurement phase of the ranging operation, according to some embodiments of the disclosure. As a convenience and not a limitation, FIG. 5B may be described with regard to elements of FIGS. 1-5A. Method 520 may represent the operation of an electronic device, e.g., iSTA 401 of FIG. 4A implementing the measurement phase of the ranging operation. Method 520 may also be performed by system 200 of FIG. 2 and/or computer system 800 of FIG. 8. But method 520 is not limited to the specific embodiments depicted in those figures and other systems may be used to perform the method as will be understood by those skilled in the arts. It is to be appreciated that not all operations may be needed, and the operations may not be performed in the same order as shown in FIG. 5B.

At 522, an electronic device (e.g., iSTA 401) transmits a first measurement frame (e.g., first measurement frame 405) to another electronic device (e.g., rSTA 403). According to some embodiments, iSTA 401 transmits first measurement frame 405 using the agreed-on parameters (e.g., the negotiated EVM requirement). For example, iSTA 401 transmits first measurement frame 405 using the second EVM level discussed above with respect to, for example, FIG. 5A.

At 524, iSTA 401 receives a second measurement frame (e.g., second measurement frame 407) from rSTA 403. According to some examples, rSTA 403 transmits second measurement frame 407 using the agreed-on parameters (e.g., the negotiated EVM requirement). For example, rSTA 403 transmits (and iSTA 401 receives) second measurement frame 407 using the third EVM level discussed above with respect to, for example, FIG. 5A.

At 526, iSTA 401 transmits the ToD of first measurement frame 405 and the ToA of second measurement frame 407. At 528, iSTA 401 receives the ToA of first measurement frame 405 and the ToD of second measurement frame 407 from iSTA 403.

At 530, iSTA 401 uses these time instants (e.g., the ToD of first measurement frame 405, the ToA of first measurement frame 405, the ToD of second measurement frame 407, and the ToA of second measurement frame 407) to determine its distance from rSTA 403, according to some embodiments. For example, iSTA 401 may use the following equation (as discussed above with respect to FIG. 4A) to determine its distance from rSTA 403:

$$\text{distance} = [(t_4 - t_1) - (t_3 - t_3)] \times \frac{c}{2},$$

where
c is the speed of light,
$t_1$ is ToD of first measurement frame 405 from iSTA 401,
$t_2$ is ToA of first measurement frame 405 at rSTA 403,
$t_3$ is ToD of second measurement frame 407 from rSTA 403,
$t_4$ is ToA of second measurement frame 407 at iSTA 401.

Figure 6:
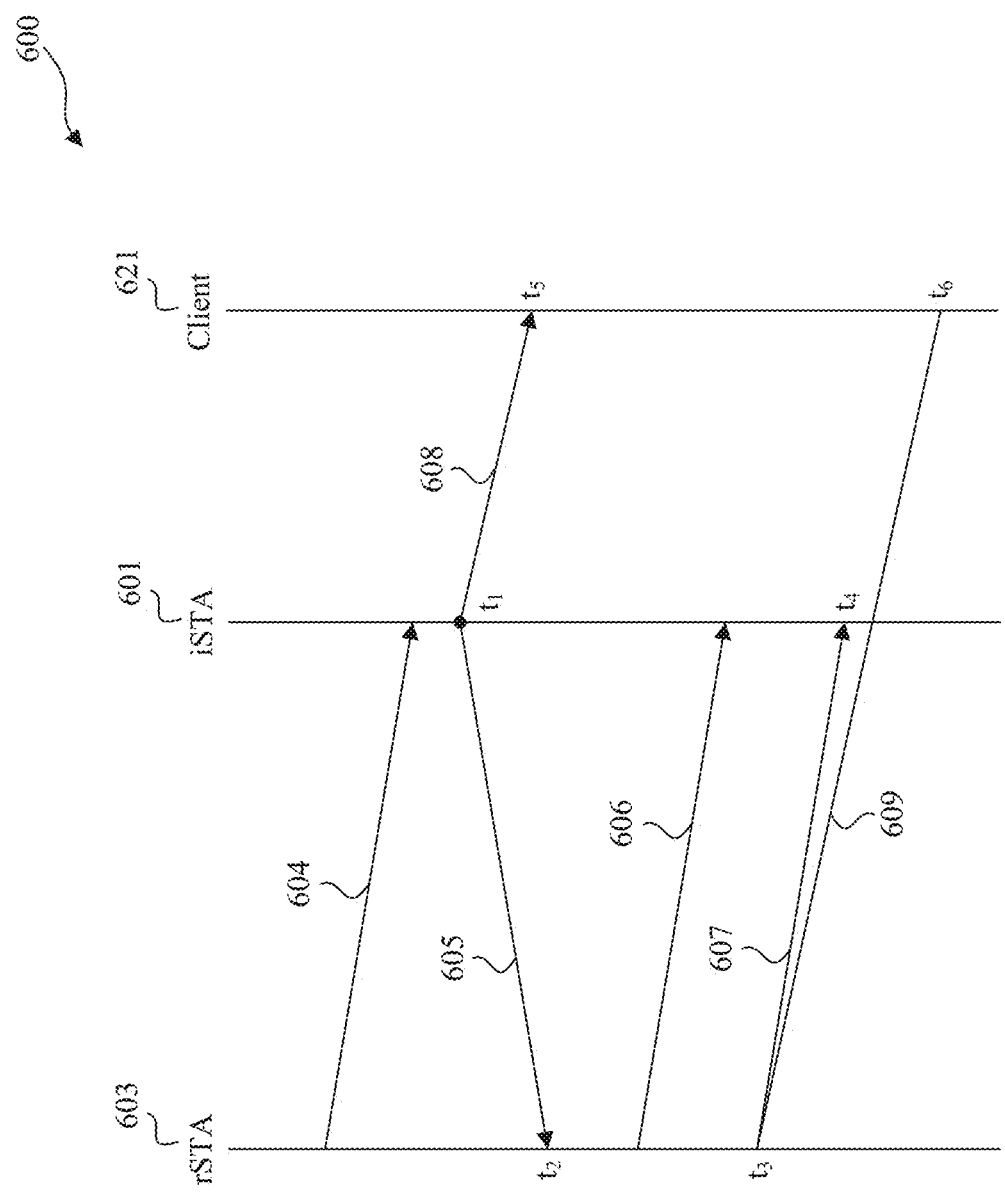
FIG. 6 illustrates example operations of communication between three electronic devices for a passive ranging operation, according to some embodiments of the disclosure.

FIG. 6 illustrates example operations of communication between three electronic devices for a passive ranging operation, according to some embodiments of the disclosure. FIG. 6 may be described with regard to elements of FIGS. 1 and 4A. Operation 600 of FIG. 6 represents the communication between three electronic devices—initiating station (iSTA) 601, responding station (rSTA) 603, and a client electronic device 621. According to some examples, iSTA 601, rSTA 603, or client electronic device 621 can be any one of STAs 120 and/or APs 110. Operation 600 of FIG. 6 can include the measurement phase of a passive ranging operation.

According to some embodiments, iSTA 601 and rSTA 603 perform a measurement phase of a ranging operation based on the methods discussed with respect to, for example, FIGS. 4A and 5B. Before performing the measurement phase, iSTA 601 and rSTA 603 also perform EVM requirement negotiation as discussed with respect to, for example, FIGS. 3 and 5A, according to some embodiments. Client electronic device 621 may passively listen to one or both of the EVM requirement negotiation and the measurement phase between iSTA 601 and rSTA 603. Client electronic device 621 can determine its relative distance to iSTA 601 and rSTA 603 using, at least, the information client electronic device 621 receives by passively listening to iSTA 601 and rSTA 603.

After the iSTA 601 and rSTA 603 have negotiated the set of measurement parameters including, but not limited to, the EVM requirement using, for example, the EVM requirement negotiation phase of operation 300 of FIG. 3, iSTA 601 and rSTA 603 can perform the measurement phase of the ranging operation. According to some embodiments, rSTA 603 can send frame 604 to iSTA 601 to start the measurement phase of the ranging operation. According to some examples, the measurement phase operation 600 can be based on a number of ranging modes defined for fine timing measurement (FTM) protocol. In one example, frame 604 can include a TF (trigger frame) location sound frame used in accordance with a trigger-based (e.g., formerly known as HEz-based) ranging measurement mode. However, frame 604 can include one or more other frames used for asking iSTA 601 to initiate the measurement phase of the ranging operation.

iSTA 601 transmits a first measurement frame 605 to rSTA 603. iSTA 601 transmits first measurement frame 605 using the agreed-on parameters (e.g., the negotiated EVM requirement). First measurement frame 605 can include the first measurement frame 405 of FIG. 4A. iSTA 601 transmits first measurement frame 605 based on the EVM level negotiated and agreed-on during, for example, operation 300 of FIG. 3 and/or method 500 of FIG. 5A.

According to some examples, iSTA 601 transmits a first measurement frame at ToD time instant $t_1$. rSTA 603 receives the first measurement frame 605 at ToA time instant $t_2$. Additionally, client electronic device 621 also receives the first measurement frame 605 (illustrated as 608 on FIG. 6) at ToA time instant $t_5$.

After receiving the first measurement frame 605, rSTA 603 transmits a second measurement frame 607 to iSTA 601 at ToD time instant $t_3$. According to some embodiments, rSTA 603 transmits the second measurement frame 607 using the agreed-on parameters (e.g., the negotiated EVM requirement). In other words, rSTA 603 transmits the second measurement frame 607 based on the EVM level negotiated and agreed-on during, for example, operation 300 of FIG. 3 and/or method 500 of FIG. 5A.

According to some embodiments, iSTA 601 receives the second measurement frame 607 at ToA time instant $t_4$. Additionally, client electronic device 621 also receives the second measurement frame 607 (illustrated as 609 on FIG. 6) at ToA time instant $t_6$.

According to some examples, before transmitting the second measurement frame 607, rSTA 603 may transmit frame 606 to iSTA 601 announcing that second measurement frame 607 will be transmitted. Frame 606 can include an null data packet announcement (NDPA) frame, for example.

Although not shown, iSTA 601 can broadcast ToD time instant $t_1$ and ToA time instant $t_4$. Therefore, rSTA 603 and client electronic device 621 can become aware of these time instants. Similarly, rSTA 603 can broadcast ToD time instant $t_3$ and ToA time instant $t_2$. Therefore, iSTA 601 and client electronic device 621 can become aware of these time instants. Using these time instants and also time instants $t_5$ and $t_6$, client electronic device 621 may determine its relative distance from iSTA 601 and rSTA 603, according to some embodiments. For example, client electronic device 621 can use the following equation to determine its relative distance from iSTA 601 and rSTA 603:

Diff_range=$[t_5-t_6-(t_4-t_1-T_{12})]\times c$, where $$T_{12} = \frac{[(t_4 - t_1) - (t_3 - t_2)]}{2},$$

and where c is the speed of light.

The relative distance "Diff_range" is client electronic device 621's distance to rSTA 603 minus client electronic device 621's distance to iSTA 601.

Client electronic device 621 can use the similar passive ranging operation with three or more pairs of electronic devices to determine three or more relative distances. Using the three or more relative distances and the known locations of the three or more pairs of electronic devices, client electronic device 621 may determine its position. Client electronic device 621 may use triangulation to determine its position, according to some embodiments.

In the passive ranging operation 600, iSTA 601 and rSTA 603 may make their EVM levels used in the passive ranging operation 600 known to the client electronic device 621. According to one example, iSTA 601 and rSTA 603 announce their EVM levels periodically in either Beacon frames, or Probe Response frames or some other frames, so that the client electronic device 621 can hear and obtain the EVM levels used in the passive ranging operation 600. Additionally or alternatively, iSTA 601 and rSTA 603 may include their EVM levels in the EVM requirement negotiation phase, so that client electronic device 621 can hear the negotiation between iSTA 601 and rSTA 603 and obtain the EVM levels used in the passive ranging operation 600.

According to some embodiments, client electronic device 621 may use the received EVM levels of iSTA 601 and rSTA 603 in choosing an appropriate algorithm for determining the relative distance. For example, if client electronic device 621 determines that the EVM levels of iSTA 601 and rSTA 603 indicate that the measurement frames are transmitted using high quality signal transmission, client electronic device 621 can use an algorithm associated with high quality signal transmission for determining the relative distance. Therefore, client electronic device 621 determines the relative distance with higher accuracy. Additionally or alternatively, client electronic device 621 may use the received EVM levels of iSTA 601 and rSTA 603 to determine the quality and/or accuracy of the determined relative distance. For example, if client electronic device 621 determines that the EVM levels of iSTA 601 and rSTA 603 indicate that the measurement frames are transmitted using low quality signal transmission, client electronic device 621 may determine that the relative distance it determines has (or may have) a low degree of accuracy.

Figure 7:
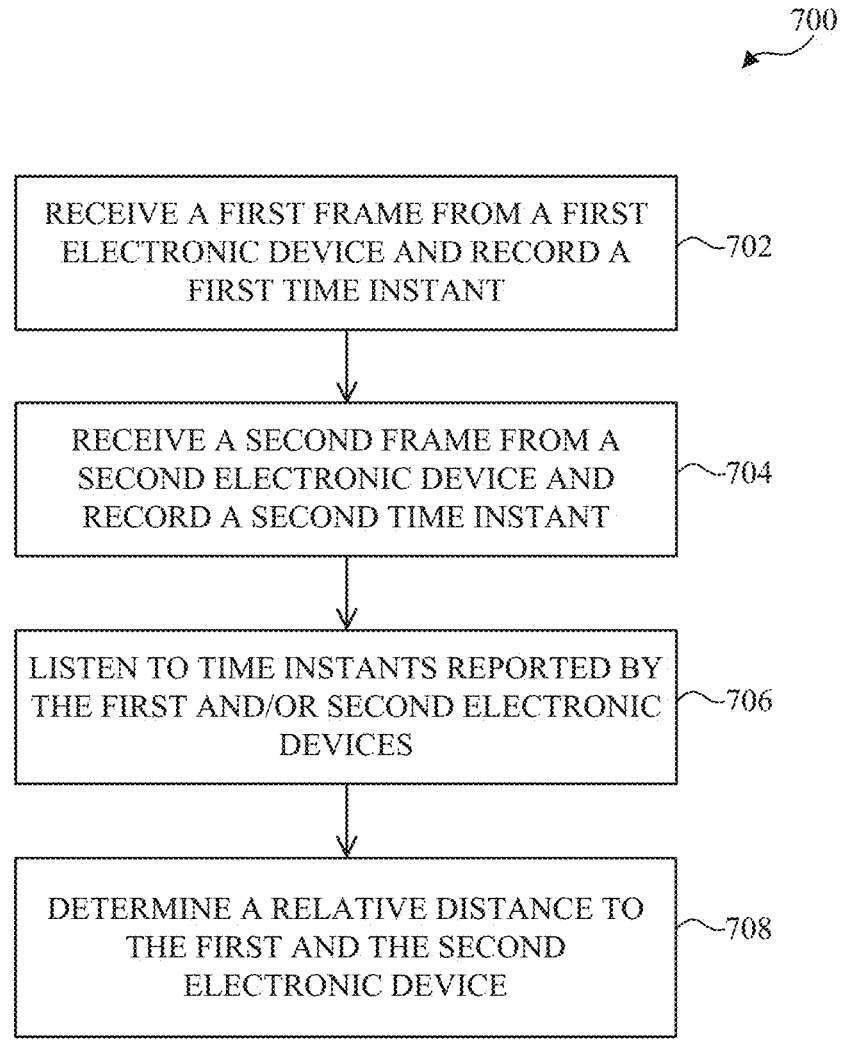
FIG. 7 illustrates an example method for a wireless system implementing a measurement phase of the passive ranging operation, according to some embodiments of the disclosure.

FIG. 7 illustrates an example method 700 for a wireless system implementing a measurement phase of the passive ranging operation, according to some embodiments of the disclosure. As a convenience and not a limitation, FIG. 7 may be described with regard to elements of FIGS. 1-6. Method 700 may represent the operation of an electronic device, e.g., client electronic device 621 of FIG. 6 implementing the passive ranging operation. Method 700 may also be performed by system 200 of FIG. 2 and/or computer system 800 of FIG. 8. But method 700 is not limited to the specific embodiments depicted in those figures and other systems may be used to perform the method as will be understood by those skilled in the arts. It is to be appreciated that not all operations may be needed, and the operations may not be performed in the same order as shown in FIG. 7.

At 702, an electronic device (e.g., client electronic device 621) receives a first frame (e.g., first measurement frame 605) from a first electronic device (e.g., iSTA 601). According to some embodiments, iSTA 601 transmits the first frame using the agreed-on parameters (e.g., the negotiated EVM requirement) that were determined during an EVM requirement negotiation with a second electronic device (e.g., rSTA 603). For example, the first frame is transmitted by the first electronic device in accordance with a first indication of EVM requirement (e.g., the second EVM level discussed above) associated with the first electronic device. Client electronic device 621 records the time instant the first frame was received (e.g., time instant $t_5$.)

At 704, client electronic device 621 receives a second frame (e.g., second measurement frame 607) from the second electronic device (e.g., rSTA 603). According to some embodiments, rSTA 603 transmits the second frame using the agreed-on parameters (e.g., the negotiated EVM requirement) that were determined during the EVM requirement negotiation with the first electronic device (e.g., iSTA 601). For example, the second frame is transmitted by the second electronic device in accordance with a second indication of EVM requirement (e.g., the third EVM level discussed above) associated with the second electronic device. Client electronic device 621 records the time instant the second frame was received (e.g., time instant $t_6$).

At 706, client electronic device 621 listens and receives the time instants reported by the first electronic device and/or the second electronic device (e.g., time instants $t_1$, $t_2$, $t_3$, and $t_4$).

At 708, client electronic device 621 determines its relative distance to the first and second electronic devices using, at least, the recorded and received time instants. According to some embodiments, client device 621 also receives the EVM levels associated with the first and second frames transmitted by iSTA 601 and rSTA 603. Client electronic device 621 may use the received EVM levels of iSTA 601 and rSTA 603 in determining its relative distance to the first and second electronic devices. For example, client electronic device 621 may use the received EVM levels in choosing an appropriate algorithm for determining the relative distance. Additionally or alternatively, client electronic device 621 may use the received EVM levels of iSTA 601 and rSTA 603 to determine the quality and/or accuracy of the determined relative distance.

Figure 8:
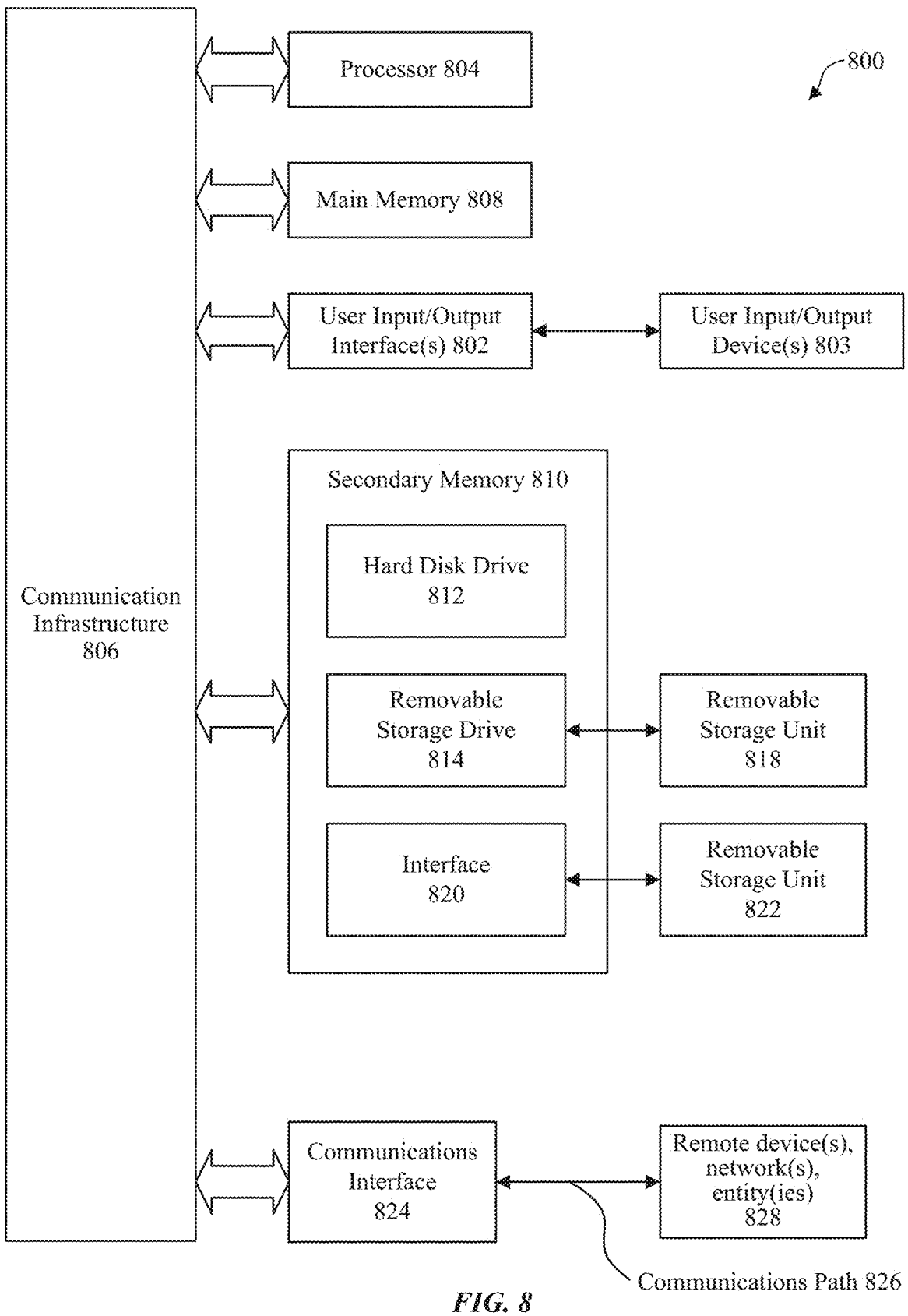
FIG. 8 illustrates an example computer system for implementing some embodiments or portion(s) thereof.

Various embodiments can be implemented, for example, using one or more computer systems, such as computer system 800 shown in FIG. 8. Computer system 800 can be any well-known computer capable of performing the functions described herein such as devices 110, 120 of FIG. 1, 200 of FIG. 2, 301, 303 of FIG. 3, 401, 403, 411 of FIGS. 4A-B, or 601, 603, 621 of FIG. 6. Computer system 800 can be used, for example, to implement method discussed in this disclosure such as, but not limited to, method 500 of FIG. 5A, method 520 of FIG. 5B, and/or method 700 of FIG. 7.

Computer system 800 includes one or more processors (also called central processing units, or CPUs), such as a processor 804. Processor 804 is connected to a communication infrastructure 806 (e.g., a bus.) Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
    a transceiver configured to communicate over a wireless network; and
    one or more processors communicatively coupled to the transceiver and configured to:
        transmit, during a negotiation phase of a ranging operation, an initial request frame to a second electronic device, wherein the initial request frame comprises a first indication of an error vector magnitude (EVM) requirement for a first measurement frame to be transmitted from the second electronic device to the electronic device;
        receive an initial response frame from the second electronic device;
        determine a second indication of the EVM requirement for the first measurement frame based at least in part on the received initial response frame; and implement a measurement phase of the ranging operation in accordance with the second indication of the EVM requirement.

2. The electronic device of claim 1, wherein:
the first indication of the EVM requirement comprises a first EVM level requested by the electronic device, and
the second indication of the EVM requirement comprises a value set in an indication field of the initial response frame representing an acceptance of the first EVM level by the second electronic device.

3. The electronic device of claim 1, wherein:
the first indication of the EVM requirement comprises a first EVM level requested by the electronic device, and
the second indication of the EVM requirement comprises a second EVM level different than the first EVM level.

4. The electronic device of claim 1, wherein the first indication of the EVM requirement comprises:
a first EVM level used by the electronic device in transmitting a second measurement frame to the second electronic device, and
a second EVM level requested by the electronic device from the second electronic device to use in transmitting the first measurement frame to the electronic device.

5. The electronic device of claim 1, wherein to implement the measurement phase of the ranging operation, the one or more processors are configured to:
transmit, to the second electronic device, a second measurement frame in accordance with the first indication of the EVM requirement; and
receive, from the second electronic device, the first measurement frame, wherein the first measurement frame is transmitted in accordance with the second indication of the EVM requirement.

6. The electronic device of claim 5, wherein to implement the measurement phase of the ranging operation, the one or more processors are configured to:
transmit, to the second electronic device, a time of departure of the second measurement frame and a time of arrival of the first measurement frame;
receive, from the second electronic device, a time of arrival of the second measurement frame and a time of departure of the first measurement frame; and
determine a distance from the electronic device to the second electronic device using at least the time of arrival and the time of departure of the first measurement frame and the time of arrival and the time of departure of the second measurement frame.

7. The electronic device of claim 1, wherein the one or more processors are further configured to transmit, during the measurement phase of the ranging operation, a second request frame to the second electronic device for re-negotiation, the second request frame comprising an updated EVM requirement.

8. A method, comprising:
transmitting, from a first electronic device and during a negotiation phase of a ranging operation, an initial request frame to a second electronic device, wherein the initial request frame comprises a first indication of an error vector magnitude (EVM) requirement for a first measurement frame to be transmitted from the second electronic device to the first electronic device;
receiving, by the first electronic device and from the second electronic device, an initial response frame;
determining, by the first electronic device, a second indication of the EVM requirement for the first measurement frame based at least in part on the received initial response frame; and
implementing, by the first electronic device, a measurement phase of the ranging operation in accordance with at least one of the first indication of the EVM requirement or the second indication of the EVM requirement.

9. The method of claim 8, wherein:
the first indication of the EVM requirement comprises a first EVM level requested by the first electronic device, and
the second indication of the EVM requirement comprises a value set in an indication field of the initial response frame representing an acceptance of the first EVM level by the second electronic device.

10. The method of claim 8, wherein:
the first indication of the EVM requirement comprises a first EVM level requested by the first electronic device, and
the second indication of the EVM requirement comprises a second EVM level different than the first EVM level.

11. The method of claim 8, wherein the first indication of the EVM requirement comprises:
a first EVM level used by the first electronic device in transmitting a second measurement frame to the second electronic device, and
a second EVM level requested by the first electronic device from the second electronic device to use in transmitting the first measurement frame to the first electronic device.

12. The method of claim 8, wherein implementing the measurement phase of the ranging operation comprises:
transmitting, from the first electronic device to the second electronic device, a second measurement frame in accordance with the first indication of the EVM requirement; and
receiving, by the first electronic device from the second electronic device, the first measurement frame, wherein the first measurement frame is transmitted in accordance with the second indication of the EVM requirement.

13. The method of claim 12, wherein implementing the measurement phase of the ranging operation further comprises:
transmitting a time of departure of the second measurement frame and a time of arrival of the first measurement frame;
receiving a time of arrival of the second measurement frame and a time of departure of the first measurement frame; and
determining a distance from the first electronic device to the second electronic device using at least the time of arrival and the time of departure of the first measurement frame and the time of arrival and the time of departure of the second measurement frame.

14. A non-transitory computer-readable medium storing instructions that, when executed by a processor of an electronic device, cause the processor to perform operations, the operations comprising:
determining a first indication of an error vector magnitude (EVM) requirement for a first measurement frame to be transmitted from a second electronic device to the electronic device for a ranging operation;
transmitting, during a negotiation phase of the ranging operation, an initial request frame to the second electronic device, wherein the initial request frame comprises the first indication of the EVM requirement;
receiving, from the second electronic device, an initial response frame, wherein the initial response frame comprises a second indication of the EVM requirement for the first measurement frame;

determining the second indication of the EVM requirement for the first measurement frame based at least in part on the received initial response frame;

transmitting, to the second electronic device, a second measurement frame in accordance with the first indication of the EVM requirement; and receiving, from the second electronic device, the first measurement frame, wherein the first measurement frame is generated in accordance with the second indication of the EVM requirement.

15. The non-transitory computer-readable medium of claim 14, wherein:

the first indication of the EVM requirement comprises a first EVM level requested by the electronic device, and the second indication of the EVM requirement comprises a value set in an indication field of the initial response frame representing an acceptance of the first EVM level by the second electronic device.

16. The non-transitory computer-readable medium of claim 14, wherein:

the first indication of the EVM requirement comprises a first EVM level requested by the electronic device, and the second indication of the EVM requirement comprises a second EVM level different than the first EVM level.

17. The non-transitory computer-readable medium of claim 14, wherein the first indication of the EVM requirement comprises:

a first EVM level used by the electronic device in transmitting the second measurement frame to the second electronic device, a second EVM level requested by the electronic device from the second electronic device to use in transmitting the second measurement frame to the electronic device, and the second indication of the EVM requirement comprises a third EVM level different than the second EVM level.

18. The non-transitory computer-readable medium of claim 14, the operation further comprising:

transmitting, to the second electronic device, a time of departure of the second measurement frame and a time of arrival of the first measurement frame;

receiving, from the second electronic device, a time of arrival of the second measurement frame and a time of departure of the first measurement frame; and determining a distance from the second electronic device using at least the time of arrival and the time of departure of the first measurement frame and the time of arrival and the time of departure of the second measurement frame.

19. The non-transitory computer-readable medium of claim 14, wherein the first and second measurement frames comprise null data packets including no data payload.

* * * * *